Patented Apr. 4, 1950

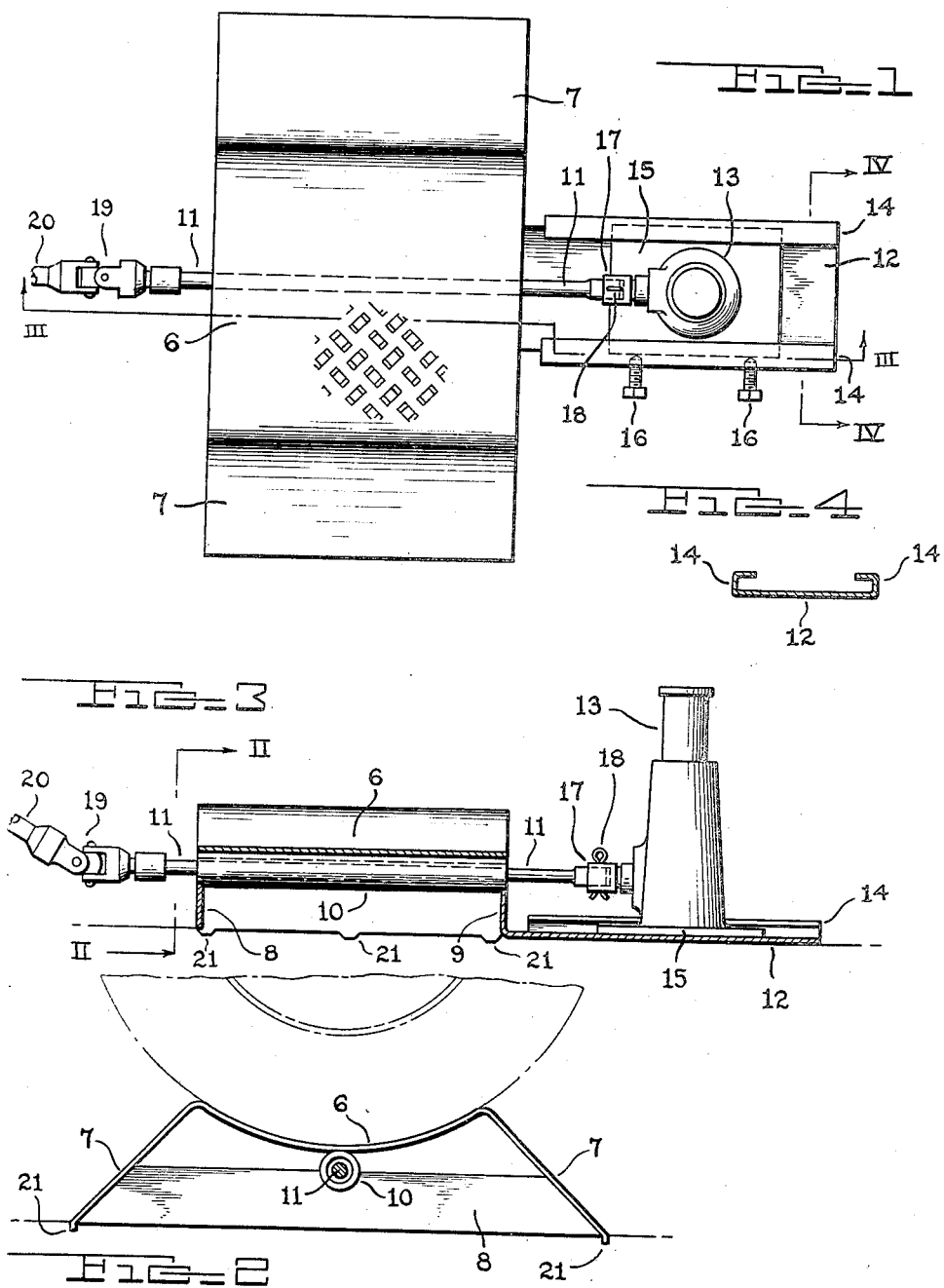

2,502,924

UNITED STATES PATENT OFFICE 2,502,924

CENTERING DEVICE FOR LIFTING JACKS

Thomas Care and Frederick Sievern, McKeesport, Pa., assignors of one-third to Sam Pandel, McKeesport, Pa.

Application October 23, 1947, Serial No. 781,598

2 Claims. (Cl. 254—88)

Our invention relates to centering devices for lifting jacks, whereby an automobile can be moved so that one of its wheels will roll onto a cradle, to thereby have its axle or its axle housing automatically positioned above a lifting jack that is held in unitary relation with the cradle.

Our invention has for its object the provision of a centering device of the character referred to which can conveniently be made mainly of sheet metal and still be of sufficient strength to support motor vehicles.

In the accompanying drawing, Figure 1 is a plan view of the device; Fig. 2 is an edge view of a portion of the structure of Fig. 1, on the line II—II of Fig. 3; Fig. 3 is a view taken on the line III—III of Fig. 1, and Fig. 4 is a view taken on the line IV—IV of Fig. 1.

The device can conveniently be in the form of sheet steel bent to form a cradle portion 6 and ramp portions 7. Bars 8 and 9 are welded to the lower portions of the ramps 7, at the inner and outer edges, respectively, of the cradle.

A tube 10 is seated in and welded to the upper edges of the bars 8 and 9 and may also be welded to the cradle 6. This tube not only serves as a bearing or support for a jack-operating shaft 11, but to stiffen the structure and to afford vertical support to the mid portion of the cradle 6. This arrangement of the bars 8—9 and the tube 10 permits of the cradle and ramp portions 6—7 being made of perhaps only 14 guage metal and nevertheless be of sufficient strength.

A base plate 12 is formed integrally with or welded to the bar 9 and serves as a support for a lifting jack 13 which may be of conventional form. The plate is in such position relative to the cradle that when a wheel is on the cradle as indicated in Fig. 2, the jack will be directly under the axle or axle housing at that wheel, the jack being then operated to lift the wheel from the cradle 6, to permit of removing the wheel for replacing a flat tire or to apply a tire chain.

The base plate 12 has flanges 14 to receive the base 15 of the jack and serving as guides for shifting the jack relative to the cradle, to thereby adapt the jack to axles and axle housings of different forms. Set screws 16 are provided for holding the jack at its adjusted positions. The jack has the usual socket 17 for a jack handle or crank. In this case, the shaft 11 has a squared end fitting into the squared socket in the member 17 and can be held therein by a pin 18. At its outer end, the shaft has jointed connection at 19 with a crank 20 for operating the jack. Calks 21 are provided on the cradle to resist slipping thereof when a vehicle wheel is moving up the ramps 7.

We claim as our invention:

1. A centering device for lifting jacks, comprising a cradle of upwardly-curved form having ramps sloping downwardly from its uppermost ends, a longitudinally-extending tie bar connecting the lower end portions of the ramps, at each side of the cradle, and a bearing below the cradle, for supporting a jack-operating shaft that extends transversely of the device, the said bearing comprising a tube interposed between the lowermost part of the cradle and the upper edges of said bars.

2. A centering device for lifting jacks, comprising a cradle of upwardly-curved form having ramps sloping downwardly from its uppermost ends, a longitudinally-extending tie bar connecting the lower end portions of the ramps, at each side of the cradle, a bearing carried by the tie bars, for supporting a jack-operating shaft that extends transversely of the device, and a jack-supporting plate carried by one of said bars, at the lowermost plane of the device.

THOMAS CARE
FREDERICK SIEVERN.

REFERENCES CITED

The following references are of record in the file of this patent:

UNITED STATES PATENTS

| Number | Name | Date |
|---|---|---|
| 1,448,250 | Au-Miller | Mar. 13, 1923 |
| 1,872,959 | Johnson et al. | Aug. 23, 1932 |
| 2,012,635 | Paden | Aug. 27, 1935 |
| 2,048,357 | Smith | July 21, 1936 |
| 2,200,994 | Polk | May 14, 1940 |
| 2,254,149 | Jensen | Aug. 26, 1941 |